Sept. 11, 1928.　　　　　　　　　　　　　　　1,684,096
J. W. HUGHES
CAP NUT
Filed Dec. 27, 1927　　　　2 Sheets-Sheet 1

Inventor:
James W. Hughes,
by Leo Edelson
Attorney.

Sept. 11, 1928.

J. W. HUGHES 1,684,096

CAP NUT

Filed Dec. 27, 1927

Inventor
James W. Hughes
By Leo Edelson
Attorney.

Patented Sept. 11, 1928.

1,684,096

UNITED STATES PATENT OFFICE.

JAMES W. HUGHES, OF PHILADELPHIA, PENNSYLVANIA.

CAP NUT.

Application filed December 27, 1927. Serial No. 242,758.

This invention relates to securing elements, and more particularly to cap nuts of the type arranged to be threaded upon suitable studs for mounting vehicle wheels in position upon their respective hubs.

Among the primary objects of the present invention is the provision of an internally threaded nut which is adapted to be threaded upon a suitable stud projecting from the wheel hub of a vehicle, the wrench-engaging surface of the nut being characterized in that it is of an oval or elliptical cross-section whereby to substantially eliminate the sharp corners and angles which are usually present in such nuts.

A further object of the invention is the provision of a cap nut arranged for threaded reception on a stud projecting from the wheel hub of a vehicle for clamping a wheel securely in position upon said hub, the external surface of said nut being free of all sharp corners and angles, thereby considerably enhancing the appearance of the nut.

A still further object of the invention is to provide a cap nut which is simple in construction and inexpensive to manufacture at the same time that it is efficient and durable in use.

A still further object of the invention is the provision of cap nuts for securing, for instance, demountable wheels in proper position upon their respective hubs, the overall dimensions of said cap nuts being considerably reduced without, however, impairing their strength or efficiency.

Other objects and objects relating to details of economy and construction will appear more fully hereinafter.

The invention consists substantially in the construction, combination, location and relative arrangement of parts, all as will be described more fully hereinafter, as shown in the accompanying drawings and as finally pointed out in the appended claims.

Figure 1:
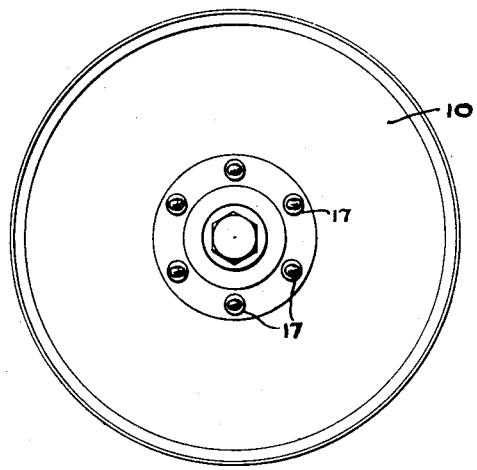
Figure 1 is a side elevation of a vehicle wheel (in this instance a disc wheel) secured in position upon its hub by means of a plurality of cap nuts embodying the principles of the present invention.

Referring more particularly to the drawings it will be seen that for purposes of illustration a demountable disc type of wheel, designated generally by the reference numeral 10, is shown in position upon its supporting hub flange 11. The wheel hub, of which the driving flange 11 forms a part is of the usual construction and for this reason is not shown in the accompanying drawings. Secured to the driving flange of the hub in any suitable manner are the outwardly projecting studs 12 upon which are arranged to be threaded one form or another of the nuts to be presently described. Five, six or any other suitable number of studs may be used according to the weight to be carried, the studs being each anchored in the hub by a hexagonal nut 13 bearing tightly against the inner surface of the flange 11. In certain instances the studs 12 are preferably anchored in the driving flange by means of riveted shoulders (not shown) on the inner ends of the studs. Any suitable means may be provided for preventing rotation of the studs with respect to the driving flange 11 in which they are secured.

Figure 2:
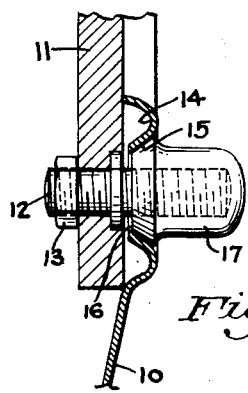
Figure 2 is a sectional view on an enlarged scale showing one of the cap nuts in wheel clamping position upon its respective stud.

As appears most clearly in Figures 1 and 2 the particular wheel 10 which is illustrated therein is provided in its central portion with an annular channel or groove 14 such that when the wheel is clamped against the driving flange 11 in the manner to be described hereinafter the central portion of said annular channel will be in spaced relation with respect to said driving flange. This central portion of the annular channel is provided with a series of circumferentially spaced depressed sockets or seats 15 corresponding in number to the number of studs secured to the driving flange 11, these sockets being tapered to provide suitable seats for the nuts. The sockets 15 are apertured, as at 16, for reception of the studs 12.

It will be observed that the diameters of the holes 16 are somewhat greater than the diameters of the respective studs 12 which project therethrough such that the studs do not touch the wheel at any point. In order to hold the wheel in proper position upon the driving flange 11, cap nuts, designated generally by the reference numeral 17 are employed, these cap nuts being each provided with an annular bearing surface 18 corresponding in shape with the tapered sockets 15 formed in the wheel 10. Each of these cap nuts 17 is threaded internally, as at 19, for threaded engagement with its respective stud 12, it being evident that as the nuts are respectively tightened upon their studs they will each center in their respective sockets 15 thereby centering the wheel in position upon the driving flange 11 at the same time that the wheel is securely clamped in said position. The drive from the wheel to the hub or from the hub to the wheel is thus transmitted through these cap nuts 17, which each have a broad contacting surface with the tapered sockets 15. Due to the fact that the central portion of the annular channel or groove 14 in the wheel is spaced from the driving flange 11 resilient bearings are provided for the tapered bearing bosses 18 of the nuts, the resiliency of these bearings being such as to cause the channel portion of the wheel to bind against the nuts 17 when the latter are tightened upon their respective studs 12.

Figure 3:
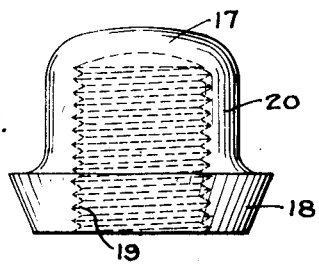
Figure 3 is a side view of that form of cap nut shown in Figure 2.
Figure 4:
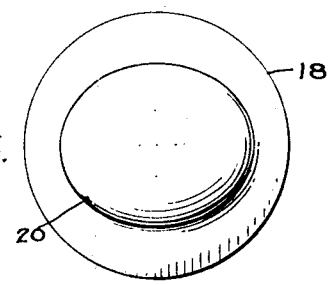
Figure 4 is a top plan view of the cap nut shown in Figure 3.
Figure 5:
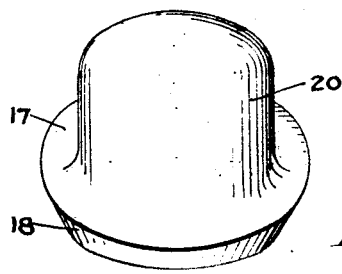
Figure 5 is a perspective view of the cap nut shown in Figure 3.

An important feature of these cap nuts 17 is the absence in the external surfaces thereof of any sharp angles or corners. As appears most clearly in Figures 3, 4 and 5 the head 20 of the cap nut 17 is of an oval, elliptical or other such curved cross-section. Not only is the general external appearance of the nut greatly enhanced due to the fact that the head thereof is of an oval or elliptical cross-section, but it is also possible to manufacture this type of nut with greater ease and with less expense A further and important advantage of this type of cap nut is that in its manufacture only a minimum amount of metal is necessary to make up the completed nut with the result that there is a considerable saving of material. And with all this there is no sacrifice of strength in the nut nor is there any impairment of its efficiency while in use. The cap nut as hereinbefore described may be stamped from sheet metal of suitable gauge, it being possible in this method of manufacture to simultaneously form the head of the nut by drawing the metal to the desired depth at the same time that the tapered bearing boss is formed by an upsetting operation. It then becomes only necessary to tap the interior of the nut in any suitable manner in order to provide the necessary internal threads. Or, the nut may be formed by the usual cold-heading method involving the manufacture of the nuts from a rod or bar of metal having a cross-section approximately corresponding to the external contour of the head of the finished nut. The completed nuts, whether they be made by either of the processes mentioned herein or by any other process, may be more readily polished and more uniformly plated by reason of the absence in the nut of any sharp corners or angles.

Figure 6:
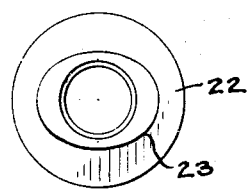
Figures 6 and 7 are top plan and side views, respectively, of a modified form of nut.
Figure 7:
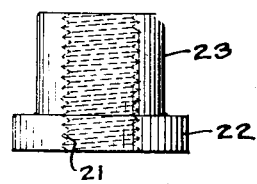

Figures 6 and 7 illustrate a modified form of nut embodying, however, the desirable features of the nut shown in Figures 2 to 5 inclusive and described hereinbefore. It will be seen that this modified form of nut differs from that hereinbefore described in that it is provided with an internally threaded bore 21 extending entirely through the nut. Instead of the tapered bearing surface, this nut is provided with a substantially flat annular flange 22 of the more or less usual construction, the wrench-engaging surface 23 of the nut being, however, of an elliptical or oval cross-section similar to that of the wrench-engaging surface of that form of nut hereinbefore described.

Figure 8:
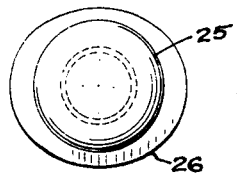
Figures 8 and 9 are top plan and side views, respectively, of still another form of nut.
Figure 9:
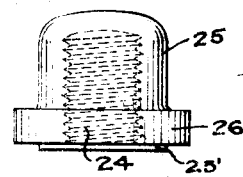

Figures 8 and 9 are top plan and side views respectively of still another form of cap nut having an internally threaded bore 24 extending partially through said nut. This cap nut differs from those hereinbefore described in that it is provided with a head portion 25 of substantially circular cross-section and a bearing portion 25' also of substantially circular cross-section. The tool-engaging portion 26, which is of substantially oval or eliptical cross-section, is arranged intermediate the head 25 and the bearing portion 25' of the nut.

Figure 10:
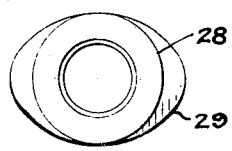
Figures 10 and 11 are top plan and side views, respectively, of still another form of nut.
Figure 11:
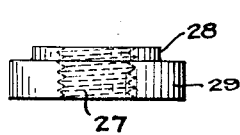

Figures 10 and 11 show still another form of flat nut provided with an internally threaded bore 27 extending therethrough. This flat nut is characterized in that the bearing portion 28 thereof is of circular cross-section while the tool engaging portion 29 thereof is of elliptical or oval cross-section. This nut differs from that shown in Figures 6 and 7 in that its bearing portion 28 is of a smaller diameter than its tool-engaging portion 29, whereas in the nut shown in Figures 6 and 7 the bearing flange 22 is of a greater transverse dimension than is its wrench-engaging portion 23.

Figure 12:
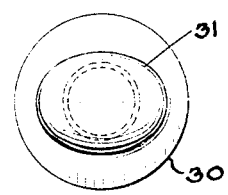
Figures 12 and 13 are top plan and side views, respectively, of still another form of nut.
Figure 13:
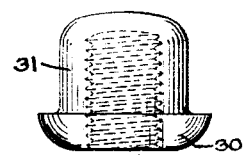

Figures 12 and 13 show still another form of cap nut which differs from that shown in Figures 2 to 5 inclusive in that its bearing surface 30 is of a ball-faced construction instead of being conically-shaped or tapered. As in the form of nut shown in Figures 2 to 5 inclusive this last described nut is also provided with a tool-engaging head 31 of elliptical or oval cross-section.

Figure 14:
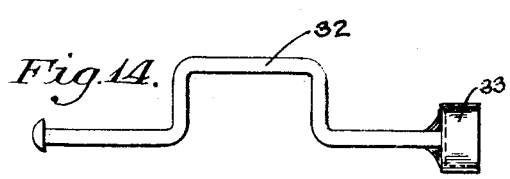
Figure 14 is a side view of a socket wrench of preferred form for tightening the nuts upon their respective studs.
Figure 15:
Figure 15 is a face view looking toward the socket end of the wrench shown in Figure 14.

Figures 14 and 15 illustrate a preferred form of socket wrench 32 for use in tightening the nuts upon their studs, this wrench being provided with a socket 33 corresponding in shape and design with the wrench-engaging surface of the nut. Due to the fact that the different forms of nuts hereinbefore described are each formed with a wrench-engaging surface having major and minor axes and that the socket 33 of the wrench is of a corresponding formation there is no possibility of the nut rotating relatively with respect to the wrench socket, yet the latter may be very readily applied to the nut when it is desired to tighten said nut upon its stud or when it is desired to loosen the nut.

It is to be understood, of course, that while for purposes of this description a disc wheel has been shown any other type of wheel employing cap nuts of the type herein described and hereinafter claimed may be used. In fact the nut characterized in that the wrench or tool-engaging surface thereof is of an oval, elliptical or other such curved contour is capable for use in connection with devices other than vehicle wheels and wherever it is desired to employ a nut of a pleasing external appearance. It is to be further understood that changes may be made from time to time in the design and construction of cap nuts of substantially the character described without departing from the spirit or principles of the invention herein described, and it is accordingly intended to claim the invention broadly, as well as specifically, as indicated in the appended claims.

What is claimed as new and useful is:

1. A cap nut comprising a bearing portion terminating in a substantially axially extending head portion and an internally threaded bore projecting through said bearing portion and into said head, one of said portions being of substantially circular cross-section and the other thereof being of substantially elliptical cross-section.

2. A cap nut having an internally threaded bore and comprising a bearing portion surrounding one end of said bore, and a head portion projecting axially from said bearing portion and embracing the opposite end of said bore, the external surface of one of said portions being of a continuously curved contour having major and minor axes.

3. A cap nut comprising a tool engaging portion, the external surface of which is contoured substantially in the form of an oval, and a bearing portion formed at one end of said tool engaging portion, said bearing portion being substantially circular in cross-section and arranged coaxially with respect to said tool engaging portion.

4. A cap nut provided with an external wrench engaging surface of a continuously curved contour having major and minor axes.

In testimony whereof, I have hereunto affixed my signature.

JAMES W. HUGHES.